(12) United States Patent
Giefer et al.

(10) Patent No.: US 7,921,746 B2
(45) Date of Patent: Apr. 12, 2011

(54) ACTUATING DEVICE WITH SHIFT LOCK

(75) Inventors: Andreas Giefer, Lemförde (DE); Jörg Meyer, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 11/995,260

(22) PCT Filed: Jun. 27, 2006

(86) PCT No.: PCT/DE2006/001106
§ 371 (c)(1),
(2), (4) Date: Jun. 27, 2008

(87) PCT Pub. No.: WO2007/009415
PCT Pub. Date: Jan. 25, 2007

(65) Prior Publication Data
US 2008/0295633 A1  Dec. 4, 2008

(30) Foreign Application Priority Data

Jul. 14, 2005   (DE) .......................... 10 2005 033 510

(51) Int. Cl.
*B60K 20/00* (2006.01)
*G05G 5/00* (2006.01)
*G05G 5/08* (2006.01)

(52) U.S. Cl. ................. 74/473.23; 74/473.21; 74/473.24

(58) Field of Classification Search ............... 74/473.21, 74/473.24, 473.26, 473.23, 473.22
See application file for complete search history.

(56) References Cited

U.S. PATENT DOCUMENTS

| | | | | |
|---|---|---|---|---|
| 5,186,069 A | * | 2/1993 | Asano et al. | 74/473.23 |
| 5,255,570 A | * | 10/1993 | Shirahama et al. | 74/473.23 |
| 5,421,792 A | * | 6/1995 | Kataumi et al. | 477/99 |
| 5,566,581 A | * | 10/1996 | Smale et al. | 74/473.22 |
| 5,588,330 A | * | 12/1996 | Kataumi et al. | 74/483 R |
| 5,651,290 A | * | 7/1997 | Osborn et al. | 74/473.22 |
| 5,718,312 A | * | 2/1998 | Osborn et al. | 192/220.4 |
| 6,325,196 B1 | | 12/2001 | Beattie et al. | |
| 2006/0016287 A1 | | 1/2006 | Grossman et al. | |

FOREIGN PATENT DOCUMENTS

| | | |
|---|---|---|
| DE | 198 18 862 | 11/1999 |
| DE | 698 15 772 | 5/2004 |
| DE | 10 2004 060 23 | 6/2006 |
| EP | 1 182 381 A2 | 2/2002 |

* cited by examiner

*Primary Examiner* — Thomas R Hannon
*Assistant Examiner* — Justin Krause
(74) *Attorney, Agent, or Firm* — McGlew and Tuttle, P.C.

(57) ABSTRACT

An actuating device (1) for a technical system, especially for selecting gears of a shift-by-wire speed-change gear includes an actuating element (2) with at least two shift positions and a locking device (8). The locking device (8) has at least one actuator (7) driven with auxiliary energy and is used to reduce the shifting path of the actuating element (2) or to lock the actuating element (2). The actuator (7) has at least three different shifting states to make it possible to embody the necessary locking functions of the actuating lever with a reduced number of actuators and hence with a comparatively low design effort. Space, weight and costs can thus be saved.

8 Claims, 2 Drawing Sheets

ACTUATING DEVICE WITH SHIFT LOCK

CROSS REFERENCE TO RELATED APPLICATIONS

This application is a United States National Phase application of International Application PCT/DE2006/001106 and claims the benefit of priority under 35 U.S.C. §119 of German Patent Application DE 10 2005 033 510.1 filed Jul. 14, 2005, the entire contents of which are incorporated herein by reference.

FIELD OF THE INVENTION

The present invention pertains to device for manually controlling or actuating a technical system such as a technical system for selecting gears of a shift-by-wire speed-change gear.

BACKGROUND OF THE INVENTION

Actuating device of this class are used, for example, but by no means exclusively, for manually selecting gears or for preselecting gears in speed-change gears of motor vehicles.

In an increasing number of motor vehicle models, gear preselection or the control of the operating state of the vehicle transmission is carried out now by means of electrical or electronic signal transmission. However, the electrical or electronic actuation of technical systems or transmissions, which makes do without a mechanical connection, inevitably brings with it a number of peculiarities. Thus, contrary to operation by means of the prior-art mechanical actuating device, the operator or driver has, in general, no feedback whatsoever on the circumstance that his operating wish may be possibly inadmissible.

To avoid errors in operation in certain situations, for example, to signal to the driver of a motor vehicle certain states of the vehicle or disturbances (e.g., failure of the communication between the shifting mechanism and the transmission), actuating device are often equipped with locking systems, which do not allow certain motions of the actuating element any longer when certain boundary conditions are present.

For example, the so-called keylock system of an actuating device for an automatic speed-change gear, which is known from the area of motor vehicles, leads to locking of the actuating element or the selector lever in position "P" (parking brake). It shall thus be prevented, in particular, that the selector lever is moved into one of the gears before starting up the engine, whereby the vehicle could start moving in an undesired manner already when the engine is started.

Another example of the use of a locking means is the P/N lock in an automatic vehicle transmission, which ensures that shifting from the shift positions "P" (parking brake) and "N" (neutral) is possible only when the brake is pressed. This likewise serves the purpose of preventing the vehicle from starting to move in an uncontrolled manner at the moment at which a gear is engaged.

Electromechanical actuators are frequently used to embody such locking functions in the actuating device with electrical or electronic signal transmission, which can be encountered increasingly frequently and which make do without any mechanical connection whatsoever between the actuating element and the system being controlled therewith or even without a mechanical connection to the locking means, e.g., a keylock or P/N lock.

In other words, this means that the situation-dependent locking of the actuating element does not take place via linkages or cables any longer, but rather only electric or electronic signals are transmitted to the actuating device. These are then converted in the actuating device and used to actuate the corresponding electrical actuators of the locking means. Electromagnetically actuated armatures are often used as actuators.

Based on the large number of locking mimics, especially in shift-by-wire speed-change mechanisms, in which, moreover, often only a situation-dependent restriction of the mobility of the gearshift lever is provided, relatively complex locking systems are frequently necessary according to the state of the art in the prior-art actuating device. The control or locking is performed in the existing locking systems mostly with the use of electromagnets, which move an armature each as a function of the flow of current. However, the armature has only two possible positions, which correspond to the two states "energized" or "non-energized."

In other words, this means, however, that only two discrete locked states can be established in this manner with an actuator, for example, "locked" or "unlocked." However, from this arises the need, in the increasingly complex locking systems, which are used, for example, in the actuating device of shift-by-wire transmissions, to provide an increasing number of electromagnetic actuators, which have two shift positions each.

However, this is disadvantageous because the space to be made available for this plurality of actuators is not readily available. Furthermore, such electromagnetic actuators have a rather substantial weight because of the copper windings present in them, which contributes to an undesired increase in the weight of the shifting unit. Last but not least, the plurality of separate actuators also causes an increase in the cost for the shifting unit, which is often unacceptable because of the cost pressure in the area of technical systems of motor vehicles.

SUMMARY OF THE INVENTION

Against this background, the object of the present invention is to provide a device for actuating a technical system, especially for the electrical or electronic shift-by-wire actuation of a speed-change gear, which has a locking means and with which the said drawbacks of the state of the art can be overcome. In particular, the locking means shall make do with the smallest possible number of actuators even in case of complex locking mimics, whereby it shall be possible, in particular, to reduce the weight and to save space and costs.

The actuating device according to the present invention comprises, in a manner known per se, an actuating element, which can be brought into at least two different shift positions. The actuating device according to the invention, furthermore comprises a locking means for restricting the shifting paths of the actuating element or for locking the actuating element against shifting motions, the locking means having at least one actuator with a mobile armature element. The actuating device according to the present invention provides the actuator such that it has or can assume at least three different shifting states. In other words, this means that at least three different locking states can be established for the actuating element even with a single actuator.

The drawbacks described in the introduction in connection with actuating device with more complicated shifting mimics or with a plurality of locking states are thus reduced or eliminated, because, thanks to the actuator having at least three different shifting states, an increased number of different locking states of, e.g., the gearshift lever of a transmission actuating unit can be embodied even with only a single actuator. Thus, the design effort is reduced by the present invention, and, furthermore, it is also possible to reduce the weight, the space needed for installation and the costs compared to the state of the art, especially in case of complex locking requirements.

The present invention is embodied now regardless of the design and the arrangement of the actuator, as long as reliable locking of the corresponding degrees of freedom of the actuating element is ensured with the locking means or actuator. The type and origin of the auxiliary energy are likewise not essential at first according to the present invention.

According to preferred embodiments of the present invention, the actuator can, however, be actuated electrically, or the actuator is based on the electromagnetic principle of action. Electrically or especially electromagnetically actuated actuators are reliable and make possible a comparatively compact design of an actuating device or transmission actuating unit.

According to another, likewise preferred embodiment of the present invention, the actuator is a linear motor. This embodiment has especially the advantage that an even greater number of different shifting states or locked states can be established with only one single actuator due to the use of a linear motor, because the armature element of a linear motor can be positioned practically as desired within its linear range of motion thanks to the special properties of the linear motor. A plurality of different relative positions of the armature element of a linear motor can therefore likewise be assigned by the design to different locked states of the actuating device.

According to another, preferred embodiment of the present invention, the actuator, more precisely, the armature element of the actuator, is connected to a mobile locking link. Since this locking link can be designed with practically any desired link shape, even relatively complex locking mimics can be embodied in this manner despite the simple linear motion of the armature element.

The actuator is especially preferably connected here to more than one mobile locking link. In other words, this means that a plurality of mobile locking links, which are separate from one another, or even mobile lock bolts, are connected to the same actuator or are controlled by one and the same actuator. This is advantageous insofar as even more complex locking mimics can be embodied in this manner. In particular, it is also possible in this manner to embody locking functions in different directions of motion or planes of motion of the actuating element simultaneously or independently from one another.

The present invention is embodied, in principle, regardless of the type of the actuating device and the technical system that is controlled by the actuating device or the actuating element. According to a preferred embodiment of the present invention, the actuating element is, however, a selector lever of a motor vehicle transmission, especially of a shift-by-wire vehicle transmission or of an automatic transmission. The present invention can be used with special advantage in the area of the actuation of vehicle transmission, because a plurality of safety-relevant locking systems are often to be provided here, and these locking systems are to be accommodated in the area of the actuating element, for example, between the front seats of a motor vehicle, with the smallest design effort possible.

According to another, preferred embodiment of the present invention, when the auxiliary energy is not available, the locking means and a corresponding actuator are in a position in which the actuating element is blocked or the mobility of the actuating element is restricted the most. In other words, this means that, for example, in case of complete failure of the actuating device, or in case of a power failure, blocking of the actuating element takes place, which can be perceived by touch.

This is especially advantageous if it is ensured in this manner that the actuating element is automatically blocked when the auxiliary energy becomes unavailable, for example, in case of a disturbance. It is thus signaled to the operator or driver in an unmistakable manner that the system is not in the ready-to-operate state or that it cannot be controlled via the actuating device at this point in time, i.e., that, for example, actuation of the automatic transmission is not possible.

According to another embodiment of the present invention, the actuating device comprises, furthermore, a device for the mechanical unlocking of the locking means. This unlocking device is available as a so-called override function especially for the case of malfunctions of the drive or the locking means. Thus, the locking device makes it possible by means of a manual mechanical unlocking of the locking means that the actuating element can nevertheless be actuated in the sense of an emergency operation, for example, in case of failure of only the locking means or of the actuator.

The present invention will be explained in more detail below on the basis of drawings showing exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
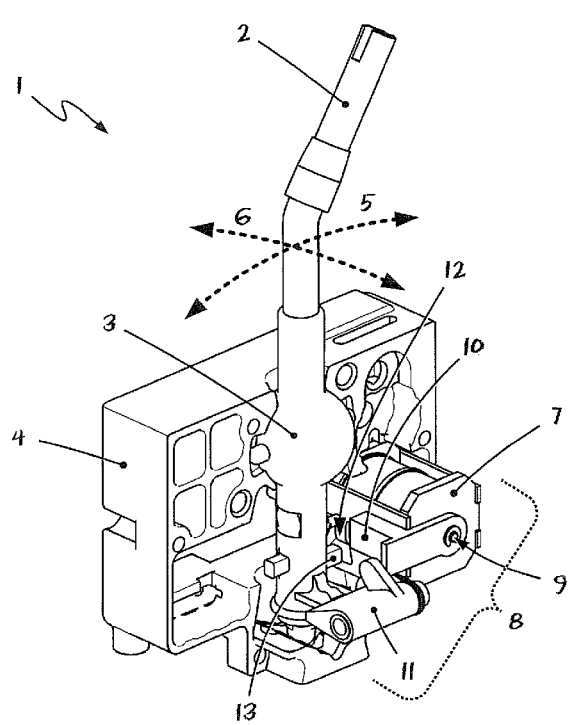
FIG. 1 is a schematic isometric and partially cut-away view of an embodiment of an actuating device for a vehicle transmission according to the invention.

Referring to the drawings in particular, FIG. 1 shows an isometric view of an embodiment of an actuating device 1 according to the present invention. This exemplary embodiment is that of an actuating device 1 for an automatic transmission of a vehicle.

Figure 2:
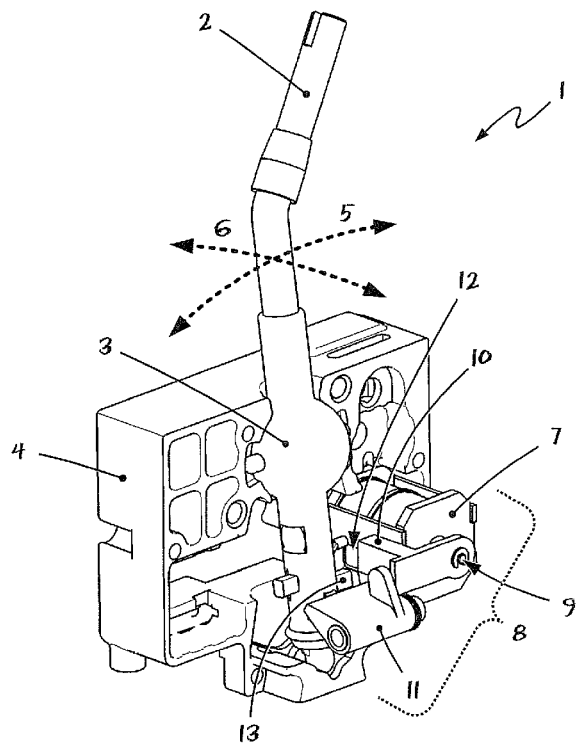
FIG. 2 is schematic isometric and partially cut-away view of the actuating device according to FIG. 1 in an actuation position.

The actuating element, which is designed as a gearshift lever 2 and which is arranged by means of a joint ball 3 in a housing 4 of the actuating device 1, which said housing is shown as a housing cut in half, is recognized at first in the views in FIG. 1 and FIG. 2. The gearshift lever 2 can be moved, thanks to the suspension by means of the joint ball 3, both forward and backward (5) in the direction of travel and also to and fro (6) at right angles to the direction of travel, as this is indicated by the two arrows 5 and 6, respectively, drawn in broken lines.

A locking means 8 comprising an actuator 7 ensures that the freedom of motion or the shifting path available for the actuation and the shifting directions available at the actuating lever 2 can be restricted or released as a function of the operating or driving state of the motor vehicle as well as a function of other boundary conditions. The other boundary conditions may be especially, but by no means exclusively, the state of the ignition key (ignition turned on/off).

The locking means 8 of the actuating device 1 or of the gearshift lever 2 according to FIGS. 1 and 2 is controlled here by a single electromagnetic actuator 7 only. The locking means 8 comprises, besides the actuator 7 and the anchor pin 9 thereof, especially a locking link 10, which is movable to and fro at right angles to the direction of travel, as well as another locking element 11, which is driven indirectly by the locking link 10. It is recognized that the anchor pin 9 and the locking link 10 are located at their left stop relative to the drawing in the view according to FIG. 1, whereas the anchor pin 9 is extended from the body of the actuator 7 and the locking link 10 is thus also displaced to the right relative to the drawing in the view according to FIG. 2.

Figure 4:
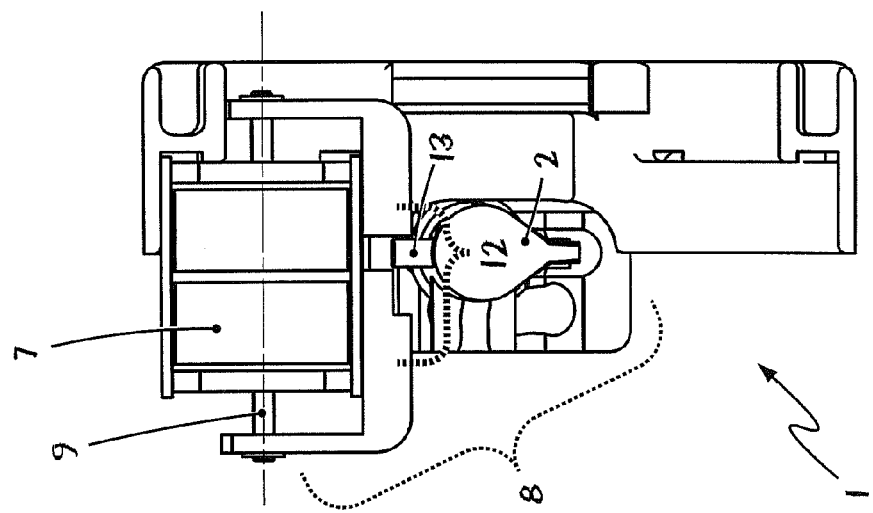
FIG. 4 is a schematic top view of the actuating device according to FIG. 3 in a second position of the actuator.
Figure 3:
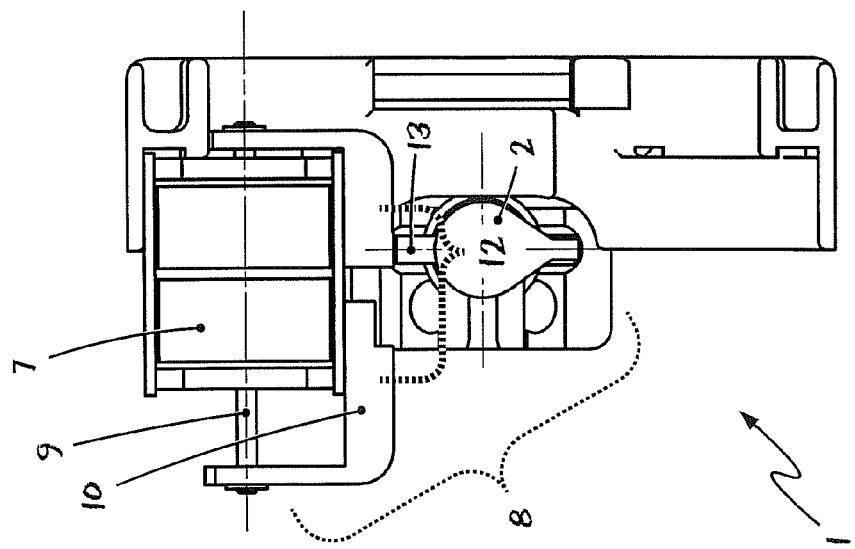
FIG. 3 is a schematic top view of another embodiment of an actuating device according to the invention, shown in a first position of the actuator.

The locking link 10 has a defined recessed contour 12 (cf. FIGS. 3 and 4). The recessed contour 12 corresponds to a locking projection 13 arranged in the lower area of the gearshift lever 2. Depending on the horizontal position of the anchor pin 9 of the actuator 7 or of the locking link 10 connected to the anchor pin 9, the freedom of motion of the gearshift lever 2 in the direction of travel of the motor vehicle (i.e., the forward and backward motion of the gearshift lever, see arrow 5 drawn in broken line) is restricted to a greater or lesser extent.

By contrast, the additional locking element 11, which is likewise driven by the actuator 7 indirectly via the locking link 10, is used to lock or restrict in a situation-dependent manner the freedom of motion of the gearshift lever 2 at right angles to the direction of travel (arrow 6 drawn in broken line). By means of the control of the additional locking element 11 by the actuator 7, it is thus possible to set whether the gearshift lever 2 can be moved to and fro between the different shift gates located next to each other in the direction of travel or whether this to and fro motion shall be locked in a situation-dependent manner.

The decisive advantage of the actuating device being shown is consequently that both a multi-step locking of the mobility of the gearshift lever 2 in the direction of travel (5) and a situation-dependent locking of the mobility of the gearshift lever 2 at right angles to the direction of travel (6) can be embodied here by means of a single actuator 7. A considerable amount of design effort, space and weight and, last but not least, costs can be saved in this manner.

Figure 5:
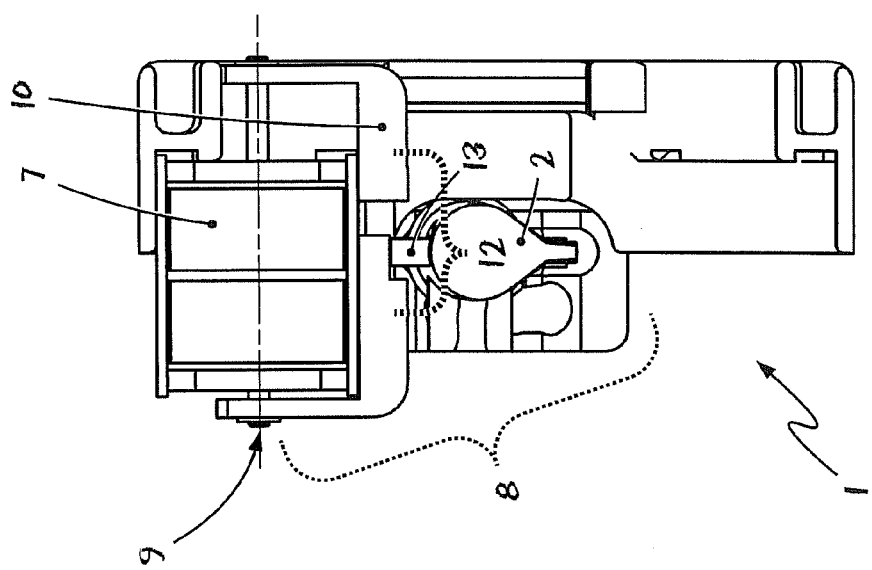
FIG. 5 is a schematic top view showing the actuating device according to FIGS. 3 and 4 in a third position of the actuator.

FIGS. 3 through 5 show another embodiment of an actuating device 1 with a locking means according to the present invention. The locking means 1 shown in FIGS. 3 through 5 with the actuator 7, the anchor pin 9, the locking link 10, the recessed contour 12 and the locking projection 13 is essentially identical to the corresponding components of the actuating device 1 according to FIGS. 1 and 2.

The actuator 7, which is connected to the locking link 10 via the anchor pin 9, can be recognized at first in FIGS. 3 through 5. The locking link 10 has, again, a recessed contour 12, which corresponds to a locking projection 13 at the actuating lever 2 (recognizable here in the top view in the cross section only).

The views in FIGS. 3 through 5 show clearly, in particular, that the mobility of the actuating lever 2 in the direction of travel is either blocked completely (FIG. 3) or is partially (FIG. 5) or completely released (FIG. 4) by the locking link 10.

In the exemplary embodiment being shown, the actuator 7 is designed such that it assumes its middle position according to FIG. 4 in the non-energized state. This is advantageous for the case of the exemplary embodiment being shown insofar as the selector lever can still always be moved to and fro between its starting position according to FIG. 3 and its middle position according to FIG. 4 in case of power failure or failure of the actuator.

As a result, it thus becomes clear that the present invention provides an actuating device for electrically or electronically controlled technical systems, especially for speed-change gears of motor vehicles, in which the necessary locking functions of the actuating lever are embodied with an especially small amount of design effort and at a comparatively low cost. The selection especially of inadmissible shifting sequences or transmission states can thus be reliably prevented in the motor vehicle by means of the locking functions which can be embodied according to the present invention, in the sense of operating and travel safety. Furthermore, the inadmissibility of certain shifting demands can thus be signaled to the operator or driver clearly by touch.

Thus, the present invention makes a major contribution to the safety, ergonomics and operability of technical systems, especially in case of use in the area of motor vehicle systems and motor vehicle transmissions.

While specific embodiments of the invention have been shown and described in detail to illustrate the application of the principles of the invention, it will be understood that the invention may be embodied otherwise without departing from such principles.

The invention claimed is:

1. An actuating device for a technical system, the actuating device comprising:
an actuating element with at least two shift positions; and
a locking means with at least an actuator operated with auxiliary energy, said locking means for reducing a shifting path of said actuating element or for locking said actuating element, said locking means comprising a locking link, said actuator having at least three different shifting states, said actuator being connected with said locking link, said locking link being connected to said actuator such that said locking link moves to and fro in a direction orthogonal to a traveling direction of a motor vehicle based on movement of said actuator or a locking pin of said locking means, said locking link being connected to said actuator via said locking pin, said locking pin being movably mounted to said actuator such that said locking pin moves between at least two positions in said direction orthogonal to the traveling direction of the motor vehicle via said actuator, said locking means comprising another movable locking link, wherein said actuator is connected to said another movable locking link, said locking link comprising a first locking link portion and a second locking link portion, said first locking link portion extending in the traveling direction of the motor vehicle, said second locking link portion extending in said direction orthogonal to the traveling direction of the motor vehicle, said first locking link portion being substantially perpendicular to said second locking link portion, said first locking pin portion being connected to said locking pin, said another movable locking link portion extending in the traveling direction of the motor vehicle.

2. An actuating device in accordance with claim 1, wherein said actuator is actuated electrically.

3. An actuating device in accordance with claim 1, wherein said actuator is actuated electromagnetically.

4. An actuating device in accordance with claim 1, wherein said actuator comprises a linear motor.

5. An actuating device in accordance with claim 1, wherein said actuating element comprises a selector lever of a motor vehicle transmission.

6. An actuating device in accordance with claim 1, wherein said locking means and said actuator are in a blocking position in the absence of auxiliary energy.

7. An actuating device in accordance with claim 6, further comprising a mechanical unlocking device for overcoming the locking means.

8. A vehicle automatic transmission actuating device comprising:
   an actuating element with at least two shift positions; and
   a locking structure comprising at least an actuator operated with auxiliary energy and an actuating element blocking structure, said locking structure reducing a shifting path of said actuating element or locking said actuating element, said actuator being movable between at least three different shifting states, said actuator being connected with said actuating element blocking structure, said actuator comprising a side surface and a front surface, said actuating element blocking structure comprising a first portion and a second portion, said first portion being located opposite said side surface, at least a portion of said second portion being located opposite said front surface with said actuator in one of said shifting states, said locking structure comprising a pin, said actuating element blocking structure being connected to said pin, said actuating element blocking structure being movably mounted to said pin such that said actuating element blocking structure moves in a direction perpendicular to a traveling direction of a motor vehicle via said actuator, said first portion extending in the traveling direction of the vehicle, said second portion extending in the direction perpendicular to the traveling direction of the motor vehicle, said locking pin being movably mounted to said actuator such that said locking pin moves between at least two positions in said direction orthogonal to the traveling direction of the motor vehicle via said actuator, said actuating element comprising a joint ball, said first portion being located adjacent to said first side with said actuator in said one of said shifting states, said first portion being located at a spaced location from said first side with said actuator in another one of said shifting states.

\* \* \* \* \*